(12) United States Patent
Spyrou et al.

(10) Patent No.: US 8,779,036 B2
(45) Date of Patent: Jul. 15, 2014

(54) CATALYSIS OF EPOXY RESIN FORMULATIONS

(75) Inventors: Emmanouil Spyrou, Schermbeck (DE); Holger Loesch, Herne (DE); Marion Ebbing-Ewald, Marl (DE); Andrea Diesveld, Gescher (DE)

(73) Assignee: Evonik Degussa GmbH, Essen (DE)

( * ) Notice: Subject to any disclaimer, the term of this patent is extended or adjusted under 35 U.S.C. 154(b) by 290 days.

(21) Appl. No.: 13/264,910

(22) PCT Filed: Mar. 16, 2010

(86) PCT No.: PCT/EP2010/053357
§ 371 (c)(1),
(2), (4) Date: Oct. 17, 2011

(87) PCT Pub. No.: WO2010/124901
PCT Pub. Date: Nov. 4, 2010

(65) Prior Publication Data
US 2012/0041101 A1    Feb. 16, 2012

(30) Foreign Application Priority Data

Apr. 29, 2009 (DE) .......................... 10 2009 002 711
Jul. 20, 2009 (DE) .......................... 10 2009 027 826

(51) Int. Cl.
*C08G 59/68* (2006.01)
*C08G 59/22* (2006.01)
*C08G 59/32* (2006.01)
*C08G 59/40* (2006.01)
*C08G 59/50* (2006.01)
*C08L 63/00* (2006.01)
*C08L 63/02* (2006.01)
*C08L 63/04* (2006.01)
*B32B 27/38* (2006.01)

(52) U.S. Cl.
USPC ........... 523/461; 523/428; 523/448; 523/453; 523/455

(58) Field of Classification Search
None
See application file for complete search history.

(56) References Cited

U.S. PATENT DOCUMENTS 2,928,809 A * 3/1960 Hicks ............................ 528/104
5,310,864 A   5/1994 Wintraecken et al.

FOREIGN PATENT DOCUMENTS

DE       241 605       12/1986
EP      0 543 466       5/1993
WO       96 12752       5/1996

OTHER PUBLICATIONS

International Search Report Issued Jun. 21, 2010 in PCT/EP10/053357 Filed Mar. 16, 2010.
U.S. Appl. No. 13/383,485, filed Jan. 11, 2012, Spyrou, et al.

* cited by examiner

*Primary Examiner* — Michael J Feely
(74) *Attorney, Agent, or Firm* — Oblon, Spivak, McClelland, Maier & Neustadt, L.L.P.

(57) ABSTRACT

The present invention relates to epoxy resin formulations comprising a specific catalyst mixture for enhancing the reactivity thereof.

22 Claims, No Drawings

CATALYSIS OF EPOXY RESIN FORMULATIONS

The present invention relates to epoxy resin formulations having a specific catalyst mixture to increase the reactivity.

The use of latent hardeners, e.g. dicyandiamide, for curing epoxy resins is known (e.g. U.S. Pat. No. 2,637,715 or U.S. Pat. No. 3,391,113). The advantages of dicyandiamide are, in particular, the toxicological acceptability and the chemically inert behavior which leads to good storage stability.

However, their slow reactivity every now and again gives an incentive to develop catalysts, known as accelerators, in order to increase this reactivity so that curing can take place even at low temperatures. This saves energy, increases the cycle time and in particular does not harm temperature-sensitive substrates. A whole series of different substances have been described as accelerators, e.g. tertiary amines, imidazoles, substituted ureas (urons) and many more.

Thus, quaternary ammonium salts are proposed as accelerators in DD 241605. However, no distinctions are made in respect of the anion. Only hydroxides and halides are mentioned and described in examples. However, these react quite sluggishly. In addition, no "moderators" such as acids, i.e. materials which can regulate the accelerating action and can therefore contribute to increasing the storage stability, are mentioned in this patent.

EP 458 502 also describes quaternary ammonium salts as accelerators. Here, halides, hydroxides and aliphatic acid radicals are mentioned as anions. Possible moderators are boric acid and maleic acid.

Despite the large number of systems used, there is still a need for catalysts which increase the reactivity but do not significantly decrease the storage stability.

It was therefore an object of the present invention to provide accelerators for epoxy resin systems which do not have the abovementioned disadvantages but instead have a high reactivity at the curing temperature and also good storage stability below the curing temperature.

It has surprisingly been found that reactive epoxy resin systems containing latent hardeners have an advantageous balance of reactivity and storage stability when a mixture of quaternary ammonium salts having aromatic acids as anion and an acid as moderator is used as accelerator.

The invention provides reactive compositions containing essentially

A) at least one epoxy resin;
B) at least one latent hardener which in the uncatalyzed reaction with component A) has a maximum of the exothermic reaction peak in the DSC at temperatures above 150° C.;
C) at least one accelerator consisting of a combination of
C1) quaternary ammonium salts having aromatic acids as counterion and
C2) a monomeric or polymeric, organic or inorganic acid;
D) optionally other conventional additives.

Epoxy resins A) generally consist of glycidyl ethers based on bisphenols of type A or F or based on resorcinol or tetrakisphenylolethane or phenol/cresol-formaldehyde novolaks, as are described, for example, in Lackharze, Stoye/Freitag, Carl Hanser Verlag, Munich Vienna, 1996 on pp. 230 to 280. Other epoxy resins mentioned there are naturally also possible. Examples which may be mentioned are: EPIKOTE 828, EPIKOTE 834, EPIKOTE 835, EPIKOTE 836, EPIKOTE 1001, EPIKOTE 1002, EPIKOTE 154, EPIKOTE 164, EPON SU-8 (EPIKOTE and EPON are trade names of products of Resolution Performance Products).

As epoxy resin component A), preference is given to using polyepoxides based on bisphenol A diglycidyl ether, bisphenol F diglycidyl ether or cycloaliphatic types.

Preference is given to using epoxy resins A) selected from the group consisting of epoxy resins A) based on bisphenol A diglycidyl ether, epoxy resins based on bisphenol F diglycidyl ether and cycloaliphatic types such as 3,4-epoxycyclohexyl-epoxyethane or 3,4-epoxycyclohexylmethyl 3,4-epoxycyclohexanecarboxylate in curable compositions according to the invention, with bisphenol A-based epoxy resins and bisphenol F-based epoxy resins being particularly preferred. According to the invention, it is also possible to use mixture of epoxy resins as component A).

Latent hardeners B) (see also EP 682 053) either have quite a low reactivity, in particular at low temperatures, or else are sparingly soluble, frequently even both. According to the invention, suitable latent hardeners are those which, in the uncatalyzed reaction (curing) with the component A), have the maximum of the exothermic reaction peak at temperatures above 150° C., with those having the maximum of the exothermic reaction peak at temperatures above 170° C. being particularly suitable (measured by means of DSC, commencing at ambient temperature (usually at 25° C.), heating rate 10 K/min, end point 250° C.). Possible hardeners are the hardeners described in U.S. Pat. No. 4,859,761 or EP 306 451. Preference is given to using substituted guanidines and aromatic amines. The most frequent representative of substituted guanidines is dicyandiamide. Other substituted guanidines can also be used, e.g. benzoguanamine or o-tolyl-biguanidine. The most frequent representative of aromatic amines is bis(4-aminophenyl) sulfone. Other aromatic diamines are also possible, e.g. bis(3-aminophenyl) sulfone, 4,4'-methylenediamine, 1,2- or 1,3- or 1,4-benzenediamines, bis(4-aminophenyl)-1,4-diisopropylbenzene (e.g. EPON 1061 from Shell), bis(4-amino-3,5-dimethylphenyl)-1,4-diisopropylbenzene (e.g. EPON 1062 from Shell), bis(aminophenyl) ether, diaminobenzophenones, 2,6-diaminopyridine, 2,4-toluenediamine, diaminodiphenylpropanes, 1,5-diaminonaphthalene, xylenediamines, 1,1-bis-4-aminophenylcyclohexane, methylenebis(2,6-diethylaniline) (e.g. LONZACURE M-DEA from Lonza), methylenebis(2-isopropyl-6-methylaniline) (e.g. LONZACURE M-MIPA from Lonza), methylenebis(2,6-diisopropylaniline) (e.g. LONZACURE M-DIPA from Lonza), 4-aminodiphenylamine, diethyltoluenediamine, phenyl-4,6-diaminotriazine, lauryl-4,6-diaminotriazine.

Further suitable latent hardeners are N-acylimidazoles such as 1-(2',4',6'-trimethylbenzoyl)-2-phenylimidazole or 1-benzoyl-2-isopropylimidazole. Such compounds are described, for example in U.S. Pat. No. 4,436,892 and U.S. Pat. No. 4,587,311.

Other suitable hardeners are metal salt complexes of imidazoles, as are described, for example, in U.S. Pat. No. 3,678,007 or U.S. Pat. No. 3,677,978, carboxylic hydrazides such as adipic dihydrazide, isophthalic dihydrazide or anthranilic hydrazide, triazine derivatives such as 2-phenyl-4,6-diamino-s-triazine (benzoguanamine) or 2-lauryl-4,6-diamino-s-triazine (lauroguanamine) and also melamine and derivatives thereof. The latter compounds are described, for example, in U.S. Pat. No. 3,030,247.

Cyanoacetyl compounds as described, for example, in U.S. Pat. No. 4,283,520, for example neopentyl glycol biscyanoacetate, N-isobutylcyanoacetamide, 1,6-hexamethylene biscyanoacetate or 1,4-cyclohexanedimethanol biscyanoacetate, are also suitable as latent hardeners.

Further suitable latent hardeners are N-cyanoacylamide compounds such as N,N'-dicyanoadipic diamide. Such compounds are described, for example, in U.S. Pat. No. 4,529,821, U.S. Pat. No. 4,550,203 and U.S. Pat. No. 4,618,712.

Other suitable latent hardeners are the acylthiopropylphenols described in U.S. Pat. No. 4,694,096 and the urea derivatives, e.g. toluene-2,4-bis(N,N-dimethylcarbamide) disclosed in U.S. Pat. No. 3,386,955.

It is naturally also possible to use aliphatic or cycloaliphatic diamines and polyamines, if they are sufficiently unreactive. An example which may be mentioned here is polyetheramines, e.g. JEFFAMINE 230 and 400. The use of aliphatic or cycloaliphatic diamines or polyamines whose reactivity has been reduced by steric and/or electronic influencing factors or/and are sparingly soluble or have a high melting point, e.g. JEFFLINK 754 (Huntsman) or CLEARLINK 1000 (Dorf Ketal) is also conceivable.

It is naturally also possible to use mixtures of latent hardeners. Preference is given to using dicyandiamide and bis(4-aminophenyl) sulfone.

The ratio of epoxy resin to the latent hardener can be varied over a wide range.

However, it has been found to be advantageous to use the latent hardener in an amount of about 1-15% by weight based on the epoxy resin, preferably 4-10% by weight.

Possible quaternary ammonium salts C1) are all cationically charged tetra-substituted nitrogen compounds, preferably tetraalkylammonium salts, which have an aromatic acid as anion. Preferred examples of such compounds are tetrabutylammonium benzoate, benzyltrimethylammonium benzoate and tetraethylammonium benzoate. Particular preference is given to using tetraethylammonium benzoate. To improve processability, these catalysts can also be applied to a solid support, e.g. silica, in order to counter the effects of a possibly hygroscopic nature. Such products are known, for example, at Evonik Degussa GmbH as VESTAGON EP SC 5050. The amount of C1) based on the epoxy resin is 0.1-5% by weight, preferably 0.3-2% by weight, particularly preferably 0.5-1.0% by weight.

As C2), it is possible to use all acids, solid or liquid, organic or inorganic, monomeric or polymeric, which have the properties of a Brönsted acid or a Lewis acid. Examples which may be mentioned are: sulfuric acid, acetic acid, benzoic acid, succinic acid, malonic acid, terephthalic acid, isophthalic acid, oxalic acid, boric acid, and also copolyesters or copolyamides having an acid number of at least 20. Preference is given to monomeric organic acids, in particular oxalic acid and/or succinic acid. The amount of C2) based on the epoxy resin is 0.01-10% by weight, preferably 0.10-1.0% by weight, particularly preferably 0.15-0.5% by weight.

Conventional additives D) can be solvents, pigments, leveling agents, matting agents and also further conventional accelerators, e.g. urons or imidazoles. The amount of these additives can vary greatly depending on the application.

The present invention also provides for the use of the reactive compositions claimed in, for example, fiber composites, adhesives, electrolaminates and powder coatings and also articles which contain a reactive composition according to the invention.

To produce the composition of the invention, the components are homogenized in suitable apparatuses, e.g. in stirred vessels, high-speed mixers, high-speed kneaders, static mixers or extruders, generally at elevated temperatures (70-130° C.). In the case of powder coating applications, the cooled mixture is crushed, milled and sieved.

The composition of the invention has a particularly good storage stability; in particular, the viscosity increase after 8 hours at 60° C. is not more than 50% of the initial value. In addition, the composition of the invention is, owing to the component C), i.e. the accelerator, which is present according to the invention, at least so reactive that complete crosslinking has taken place after 30 minutes at 140° C.

Depending on the field of application, the reactive composition can be applied in any way, e.g. by means of a doctor blade, painted, sprinkled, squirted, sprayed, cast, flooded or impregnated.

In the case of powder coatings, for example, the sieved powder is electrostatically charged and then sprayed onto the substrate to be coated.

After application of the reactive composition to the substrate, curing can be carried out at elevated temperature in one or more stages, with or without superatmospheric pressure. The curing temperature is in the range from 70 to 220° C., usually from 120 to 180° C. The curing time is in the range from 1 minute to a number of hours, usually from 5 minutes to 30 minutes, depending on reactivity and temperature.

The invention is illustrated below with the aid of examples. Alternative embodiments of the present invention can be derived in an analogous way.

EXAMPLES

| Starting material | Product description, manufacturer |
|---|---|
| EPIKOTE 828 | Component A) diglycidyl ether of bisphenol A, Resolution |
| DYHARD SF 100 | Component B) dicyandiamide, Evonik Degussa GmbH |
| TEAB | Component C1) tetraethylammonium benzoate, Evonik Degussa GmbH |
| TBACl | Tetrabutylammonium chloride, Aldrich |
| TMAAc | Tetramethylammonium acetate, Aldrich |
| Oxalic acid | Component C2), Aldrich |

All formulation constituents were mixed very well in a glass flask by means of a magnetic stirrer and then tested for storage stability by means of a viscosity measurement and for reactivity by means of curing in a coating.

Composition

All figures in % by weight

|  | 1* | 2* | 3 | 4* | 5* |
|---|---|---|---|---|---|
| EPIKOTE 828 | 95 | 94 | 93.8 | 93.8 | 93.8 |
| DYHARD SF 100 | 5 | 5 | 5 | 5 | 5 |
| TEAB |  | 1 | 1 |  |  |
| Oxalic acid |  |  | 0.2 | 0.2 | 0.2 |
| TBACl |  |  |  | 1 |  |
| TMAAc |  |  |  |  | 1 |

*Comparative experiments which are not according to the invention a) Storage Stability

| | Viscosity at 23° C. after storage in a convection drying oven [Pas] | | | | |
|---|---|---|---|---|---|
| No.: | Start | 2 h 60° C. | 4 h 60° C. | 6 h 60° C. | 8 h 60° C. (increase compared to start) |
| 1* | 22 | 23 | 23 | 23 | 23 (5%) |
| 2* | 20 | 29 | 68 | 333 | 3391 (17 000%) |
| 3 | 16 | 17 | 18 | 19 | 19 (19%) |

-continued

Viscosity at 23° C. after storage in a convection drying oven [Pas]

| No.: | Start | 2 h 60° C. | 4 h 60° C. | 6 h 60° C. | 8 h 60° C. (increase compared to start) |
|---|---|---|---|---|---|
| 4* | 15 | 16 | 16 | 16 | 16 (7%) |
| 5* | 15 | 16 | 16 | 21 | 30 (100%) |

*Comparative experiments which are not according to the invention

The compositions 1, 3 and 4 are storage-stable (viscosity increase after 8 h at 60° C. not greater than 50%), 2 and 5 are not storage-stable (viscosity increase after 8 h at 60° C. greater than 50%).

b) Reactivity

The compositions 1, 3, 4 and 5 were applied by doctor blade to steel plates and cured at 140° C. for 30 minutes in a convection oven. This gave the following coating data:

| | No. | | | |
|---|---|---|---|---|
| | 1* | 3 | 4* | 5* |
| Layer thickness [μm] | 38-42 | 32-42 | 31-38 | 27-39 |
| Erichsen cupping [mm] | 0.5 | 7.5 | 0.5 | 5.5 |
| Ball impact dir/indir [inch * lbs] | <10/<10 | 40/30 | <10/<10 | 20/20 |
| Cross-cut (0: no detachment, 5: complete detachment) | 5 | 0 | 5 | 5 |
| MEK test (double strokes) | 8 | >100 | 15 | >100 |
| Remark | not cured | cured | not cured | cured |

*Comparative experiments which are not according to the invention
Erichsen cupping in accordance with DIN 53 156
Ball impact in accordance with ASTM D 2794-93
Pendulum hardness in accordance with DIN 53 157
Cross-cut in accordance with DIN 53 151
MEK test: methyl ethyl ketone resistance test by rubbing with a cotton wool ball impregnated with MEK under a 1 kg load until the layer dissolves (double strokes are counted).

The compositions 1 and 4 did not cure: the flexibility (Erichsen cupping<5 mm, ball impact<10 mm) is not satisfactory and the resistance to chemicals (MEK test<100 double strokes) is too low.

The compositions 3 and 5 cured: the flexibility (Erichsen cupping>5 mm, ball impact>10 inch*lbs) is satisfactory and the resistance to chemicals (MEK test>100 double strokes) is sufficient.

Only the composition 3 according to the invention is both storage-stable and sufficiently reactive.

The invention claimed is:

1. A reactive composition, consisting essentially of:
A) at least one epoxy resin;
B) at least one latent hardener, which in an uncatalyzed reaction with the epoxy resin A) has a maximum of the exothermic reaction peak in the DSC at temperatures above 150° C.; and
C) at least one accelerator consisting of
C1) at least one quaternary ammonium salt having at least one aromatic acid as counterion, and
C2) a monomeric or polymeric, organic or inorganic acid
wherein the amount of the acid C2) is 0.01 to 10% by weight based on the weight of epoxy resin A).

2. The composition of claim 1, wherein the amount of the acid C2) is 0.15 to 0.5% by weight based on the weight of epoxy resin A).

3. A reactive composition, comprising:
A) an epoxy resin;
B) a latent hardener, which in an uncatalyzed reaction with the epoxy resin A) has a maximum of the exothermic reaction peak in the DSC at temperatures above 150° C.; and
C) an accelerator consisting of
C1) at least one quaternary ammonium salt having at least one aromatic acid as counterion, and
C2) a monomeric or polymeric, organic or inorganic acid,
wherein the amount of the acid C2) is 0.01 to 10% by weight based on the weight of epoxy resin A).

4. The composition of claim 3, further comprising:
D) a conventional additive.

5. The composition of claim 4, wherein the conventional additive D) is at least one selected from the group consisting of a solvent, a pigment, a leveling agent, a matting agent, an accelerator, an uron, and an imidazole.

6. The composition of claim 3, wherein the epoxy resin A) comprises a glycidyl ether obtained from at least one selected from the group consisting of a bisphenol of type A or F, resorcinol, tetrakisphenylolethane, and a phenol/cresol-formaldehyde novolak.

7. The composition of claim 3, wherein the epoxy resin A) is at least one selected from the group consisting of bisphenol A diglycidyl ether, bisphenol F diglycidyl ether, and cycloaliphatic epoxy resins.

8. The composition of claim 3, wherein the latent hardener B) is at least one selected from the group consisting of a substituted guanidine and an aromatic amine.

9. The composition of claim 8, wherein the latent hardener B) is at least one selected from the group consisting of dicyandiamide and bis(4-aminophenyl) sulfone.

10. The composition of claim 3, wherein the latent hardener B) is at least one selected from the group consisting of bis(3-aminophenyl) sulfone, 4,4'-methylenediamine, 1,2- or 1,3- or 1,4-benzenediamine, bis(4-aminophenyl)-1,4-diisopropylbenzene, bis(4-amino-3,5-dimethylphenyl)-1,4-diisopropylbenzene, bis(aminophenyl) ether, a diaminobenzophenone, 2,6-diaminopyridine, 2,4-toluenediamine, a diaminodiphenylpropane, 1,5-diaminonaphthalene, a xylenediamine, 1,1-bis-4-aminophenylcyclohexane, methylenebis(2,6-diethylaniline), methylenebis(2-isopropyl-6-methylaniline), methylenebis(2,6-diisopropylaniline), 4-aminodiphenylamine, diethyltoluenediamine, phenyl-4,6-diaminotriazine and lauryl-4,6-diaminotriazine.

11. The composition of claim 3, wherein the quaternary ammonium salt C1) is a tetraalkylammonium salt.

12. The composition of claim 11, wherein the quaternary ammonium salt is at least one selected from the group consisting of tetrabutylammonium benzoate, benzltrimethylammonium benzoate, and tetraethylammonium benzoate.

13. The composition of claim 3, wherein the acid C2) is at least one selected from the group consisting of sulfuric acid, acetic acid, benzoic acid, succinic acid, malonic acid, terephthalic acid, isophthalic acid, oxalic acid, boric acid, and a copolyester or a copolyamide having an acid number of at least 20.

14. The composition of claim 3, wherein the acid C2) is at least one selected from the group consisting of oxalic acid and succinic acid.

15. The composition of claim 3, wherein an amount of the quaternary ammonium salt C1) based on the epoxy resin is 0.1-5% by weight.

16. The composition of claim 3, wherein an amount of the acid C2) based on the epoxy resin is 0.01-1.0% by weight.

17. The composition of claim 3, wherein the amount of the acid C2) is 0.15 to 0.5% by weight based on the weight of epoxy resin A).

18. The composition of claim 3, wherein the composition is storage-stable, with a viscosity increase after 8 hours at 60° C. of not more than 50% of an initial viscosity.

19. The composition of claim 3, wherein the composition is at least so reactive that complete crosslinking occurs after 30 minutes at 140° C.

20. A process for producing the reactive composition of claim 3, comprising homogenization of components A), B) and C).

21. An article comprising the composition of claim 3, wherein the article is selected from the group consisting of fiber composites, adhesives, electrolaminates, and powder coatings.

22. An article comprising the reactive composition of claim 3.

* * * * *